United States Patent
Richter

(10) Patent No.: US 8,033,672 B2
(45) Date of Patent: Oct. 11, 2011

(54) GLARE PROTECTION DEVICE FOR GPS OR SIMILAR APPARATUS

(76) Inventor: Harald Richter, Engelsbrand (DE)

(*) Notice: Subject to any disclaimer, the term of this patent is extended or adjusted under 35 U.S.C. 154(b) by 119 days.

(21) Appl. No.: 12/584,544

(22) Filed: Sep. 8, 2009

(65) Prior Publication Data
US 2011/0007397 A1 Jan. 13, 2011

(30) Foreign Application Priority Data
Jul. 7, 2009 (DE) .................... 20 2009 009 248 U

(51) Int. Cl.
G02B 21/00 (2006.01)
G02B 27/00 (2006.01)
(52) U.S. Cl. .................... 359/612; 359/601; 359/609
(58) Field of Classification Search ........... 359/601–614
See application file for complete search history.

(56) References Cited

U.S. PATENT DOCUMENTS

| 3,062,917 A * | 11/1962 | Rose .............................. 348/842 |
| 4,444,465 A | 4/1984 | Giulie et al. |
| 5,101,298 A * | 3/1992 | Lentz et al. .................... 359/612 |
| 5,218,474 A | 6/1993 | Kirschner |
| 5,900,979 A * | 5/1999 | Heller et al. ................... 359/609 |
| 6,050,833 A * | 4/2000 | Danzyger et al. ............... 439/92 |
| 6,144,418 A | 11/2000 | Kappel et al. |
| 7,304,839 B1 * | 12/2007 | Burns ....................... 361/679.55 |
| 2005/0098591 A1 * | 5/2005 | Kushner ........................ 224/269 |

FOREIGN PATENT DOCUMENTS

DE 20 2008 001 314 U1 4/2008

OTHER PUBLICATIONS

Publication "Audio Video Foto" Magazin Oct. 2009, p. 120.

* cited by examiner

Primary Examiner — Thong Nguyen
(74) Attorney, Agent, or Firm — Klaus J. Bach

(57) ABSTRACT

In a glare protection device for navigation apparatus or similar apparatus, comprising a glare protection wall structure of upside down U-shape having a horizontal upper wall and two side walls extending from the opposite ends of the horizontal upper wall downwardly and a spring bracket for the selective attachment of the glare protection device to an apparatus, each of the side walls is pivotally supported on the horizontal upper wall by way of a hinge so as to be movable between a downwardly extending use position and an ineffective position in which the side walls are pivoted inwardly against the bottom side of the horizontal upper wall.

7 Claims, 3 Drawing Sheets

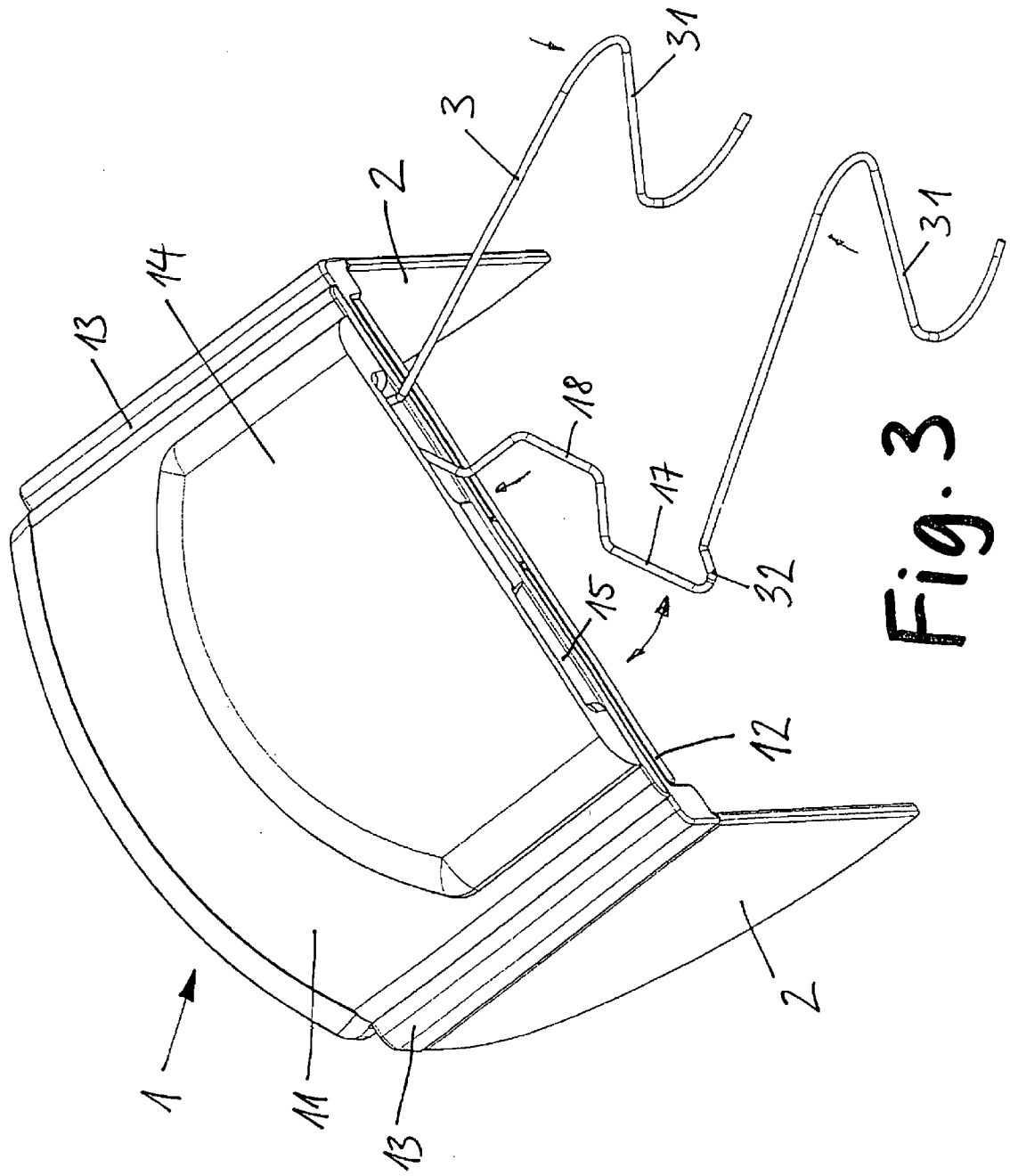

GLARE PROTECTION DEVICE FOR GPS OR SIMILAR APPARATUS

BACKGROUND OF THE INVENTION

The invention relates to a glare protection device for display screens of electronic devices such as navigation apparatus used in motor vehicles.

The convenient use of navigation apparatus in motor vehicles depends to a large extent on the clear visibility of the display on the screen of the apparatus. The navigation apparatus widely used today are usually supported by an apparatus holder which includes a support structure with a suction foot which is attached for example to the windshield wherein the support structure is adjustable in itself. The support structure is for example in the form of a so-called goose neck or it includes an adjustable lockable hinge mechanism connected to a support plate or a clamping jaw holder or similar device to hold the navigation apparatus in a position which is convenient for the driver so that the display screen of the apparatus is easily visible.

However, in practical use, often the reading of the screen display is detrimentally affected or even made impossible by incident light in the form of sunbeams causing possibly strong glare effects.

It is known to counter this problem by mounting onto the apparatus a glare protector which is in the form of an upside down U-shaped wall structure with a horizontal upper glare protection wall and two glare protection side walls and spring clamps for mounting the protector onto the apparatus when needed.

Such known glare protection devices improve the problem but they are by far not optimal, since each such glare protection device results also in a sight impediment since it detrimentally affects the visibility of the display screen of the apparatus. This is because, with an inclined view angle, parts of the display screen are covered. Some known glare protection devices therefore are a compromise. For a good glare protection effect, the upper wall as well as the side walls need to be as deep as possible but the greater the depth of the walls, the greater is the sight impediment. Therefore such known glare protection devices have glare protection walls of only relatively small depth so that the sight impediment is not excessive. Then however, also the glare protection effect is only limited and the glare protection may even be fully ineffective when the incident light reaches the screen at an angle from the back at one or the other side.

It is therefore the object of the present invention to provide a glare protection device which offers on one hand a very good and effective glare protection but on the other hand minimizes visibility impediment of the display screen of the apparatus.

SUMMARY OF THE INVENTION

In a glare protection device for navigation apparatus or similar apparatus, comprising a glare protection wall structure of upside down U-shape having a horizontal upper wall and two side walls extending from the opposite ends of the horizontal upper wall downwardly and means for the selective attachment of the glare protection device to an apparatus, each of the side walls is pivotally supported on the horizontal upper wall by way of a hinge so as to be movable between a downwardly extending use position and an ineffective position in which they are pivoted inwardly against the bottom side of the horizontal upper wall.

Furthermore, preferably the upper glare protection wall has sidewardly extendable elements and the side glare protection walls are pivotally supported on these sidewardly extendable elements.

In this way, several advantages are obtained which substantially improve the usefulness of the glare protection device.

On one hand, the invention takes into consideration that a glare-generating light beam always enters only from one or the other side. This means that always only the left or the right glare protection wall is needed when the incident light comes form the left or from the right. The unneeded side wall can then be pivoted upwardly onto the upper wall so that this side wall is no longer an impediment for the visibility of the display screen. On the other hand, an arrangement of the side walls on sidewardly extendable elements of the upper wall makes not only an adjustment of the effective width of the glare protection device to different navigation or other display apparatus with screens of different widths possible, but it also permits a sideward displacement of the left side wall when this is needed for glare protection from light incident from the left; but the apparatus is arranged to the right of the driver and, from his point of view, a part of the display screen would otherwise be covered.

The adjustability of the width of the glare protection device is advantageous especially also when it is taken into consideration that some of the most common navigation apparatus have a display screen with broadside display whereas others have an upright format.

With the device according to the invention, the glare protection device may be provided with glare protection walls of high depth providing for a very efficient glare protection effect.

An embodiment of the invention will be described below in greater detail with reference to the accompanying drawings.

BRIEF DESCRIPTION OF THE DRAWINGS

FIG. 3 is a perspective view of the lower protection device as seen at an angle from the top rear.

DESCRIPTION OF A PARTICULAR EMBODIMENT

Figure 1:
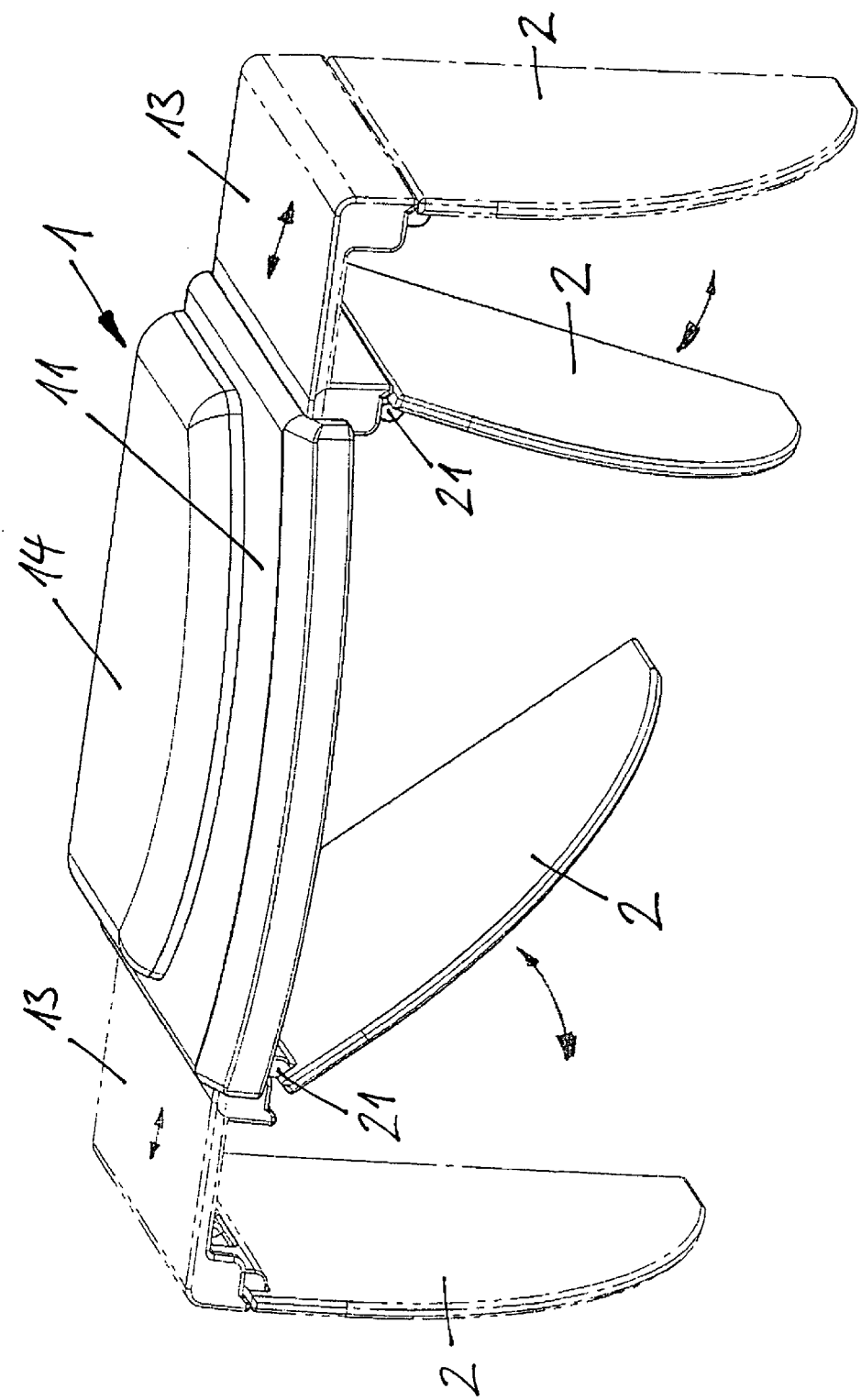
FIG. 1 is a perspective front view of the glare protection device according to the invention.

The glare protection device as shown in the drawings includes an upper horizontal wall part 1 and two side wall parts 2 which can be both pivoted inwardly.

Figure 2:
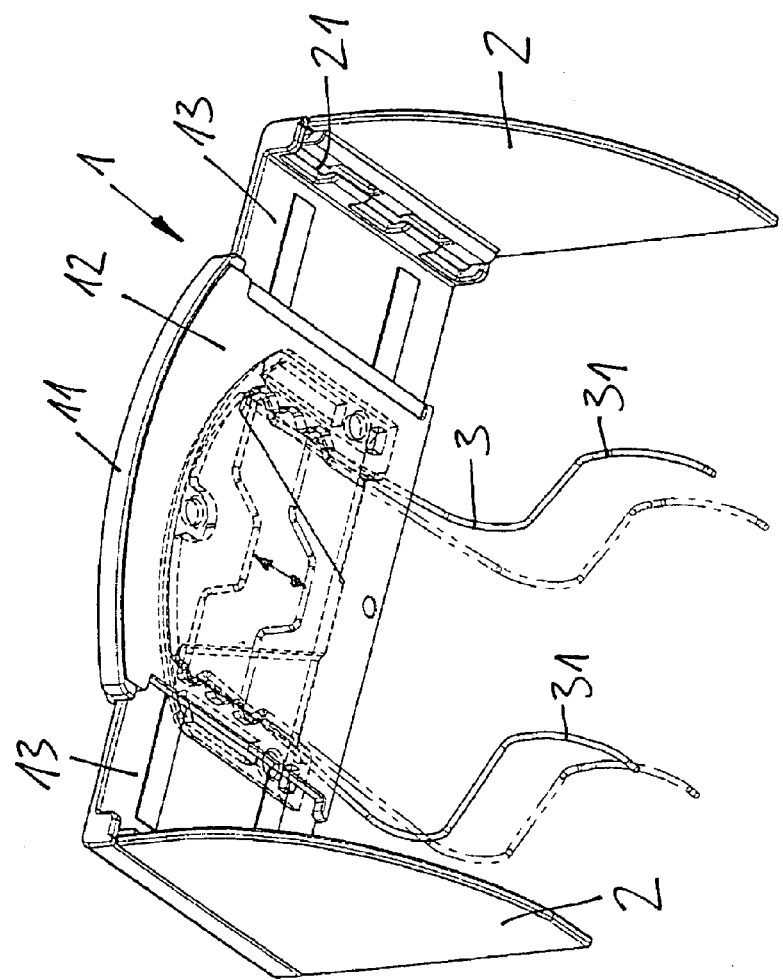
FIG. 2 is a perspective front view of the glare protection device at an angle from below.

The upper wall part 1 consists of a guide housing comprising an upper section 11 and a lower section 12 (the latter being visible in FIG. 2) and two extension elements 13 which are slidably supported in the guide housing and which can be pulled sidewardly out of the housing. Each pivotable side part 2 is hinged to the free end of the respective extendable element 13 by means of a hinge 21 and is pivotable between a downwardly extending use position and a rest position in which it is pivoted inwardly onto the bottom side of the upper wall part 1.

FIG. 1 shows the arrangement in full lines with the extension elements 13 fully inserted into the guide housing and with the side parts 2 connected thereto, wherein arrows are provided to indicate the pivotability of the side parts 2. Additionally, the extension elements 13 are shown by dash-dotted lines in their sidewardly extended positions, again with the side parts 2 arranged on the extension elements.

Figure 4:
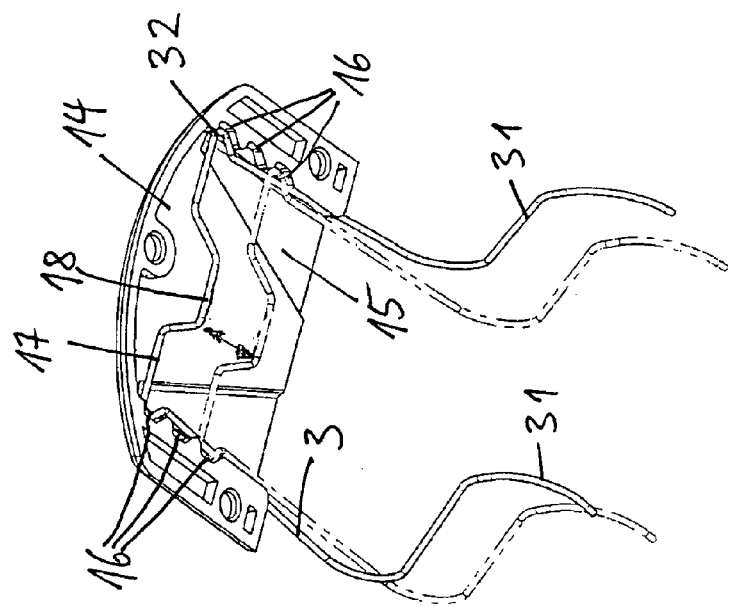
FIG. 4 is a perspective bottom view the adjustable retaining structure of a spring bracket in the glare protection device.

On the upper section 11 of the guide housing 11, 12, a lid 14 is disposed which accommodates a spring bracket 3 consisting of a bent spring wire (FIGS. 2 and 4) via which the glare protection device can be selectively attached to an apparatus. The lid 14 which is shown in FIG. 1 in an inclined perspective top view, is shown in FIG. 4 in a perspective bottom view. This lid 14 forms together with the top side of the upper section 11, a flat accommodation chamber 15 for receiving the U-shaped center area of the spring bracket 3 from which the two legs 31 project so as to form spring clamps.

At the side walls of the flat accommodation chamber 15, a number of side indentations 16 are formed in a row, three as shown in the exemplary embodiment, which provide for accommodation recesses in which engagement projections in the form of sidewardly extending outcrops 32 can be accommodated. The U-shaped connecting web 17 joining the two legs 31 is provided in the center area thereof with a large bent-in area 18 which provides for the spring bracket a corresponding spring elasticity in transverse direction, so that projections of the U-area of the spring bracket 3 which is disposed in the flat hollow space 15 can be engaged in the respective suitable engagement indentations 16.

In this way, the respective suitable engagement projections can be engaged and the legs 31 forming the spring clamps project more or less far backwardly from the glare protection device depending on the thickness of the device including the respective holder.

What is claimed is:

1. A glare protection device for display screens comprising a glare protection wall body of an upside down U-shape having a horizontal upper wall (1) and two side walls (2) extending from opposite ends of the horizontal upper wall (1) downwardly, and a U-shaped spring bracket (3) bent from spring wire so as to form a U-shape area which is accommodated in an opening in the upper wall (1) and which has legs (31), which form spring clamps projecting backwardly out of the opening in the upper wall (1) for attachment of the glare protection device to a display screen to be equipped therewith, wherein each of the side walls is pivotally supported on the horizontal upper wall (1) by way of a hinge (21) so as to be movable between a downwardly extending use position and an ineffective rest position in which they are pivoted inwardly against a bottom side of the horizontal upper wall (1).

2. The glare protection device according to claim 1, wherein the upper wall (1) is variable with respect to the width thereof between the two side walls (2) by means of extension elements (13), which are movable relative to each other.

3. The glare protection device according to claim 2, wherein the upper wall has a center part (11, 12) in the form of a guide structure wherein two extension elements (13) are slidably supported so that they can be extended from the opposite sides of the center part and the side walls (2) are connected by the hinges (21) to the free ends of the extension elements (13).

4. The glare protection device according to claim 3, wherein the guide housing is formed by an upper element (11) and a lower element (12) which are interconnected and form between them guide channels for the extension elements (13).

5. The glare protection device according to claim 1, wherein the opening in the upper wall (1) is formed by a flat inner space (15) of a lid (14) disposed on the upper wall (1) for accommodating the U-shaped area of the spring bracket (3).

6. The glare protection device according to claim 5, wherein the U-shape area of the spring bracket (3) is provided with a bent out projection element (32) formed from the wire and cooperating with one of several engagement indentations (16) provided in the opening.

7. The glare protection device according to claim 6, wherein the U-shape area of the spring bracket (3) includes at opposite sides, outwardly curved projection elements (32) which cooperate with two rows of engagement indentations (16) formed in the opposite side walls of the opening and wherein the U-shape area of the spring bracket is made resilient in transverse direction by a central bent-in compensation area (18).

* * * * *